United States Patent
Zielinski et al.

(10) Patent No.: US 8,986,816 B2
(45) Date of Patent: Mar. 24, 2015

(54) DECORATIVE DECAL SYSTEM FOR AN AIRCRAFT

(75) Inventors: Edward Zielinski, Kent, WA (US); James T. Iwamoto, Renton, WA (US)

(73) Assignee: The Boeing Company, Chicago, IL (US)

( * ) Notice: Subject to any disclaimer, the term of this patent is extended or adjusted under 35 U.S.C. 154(b) by 680 days.

(21) Appl. No.: 13/180,988

(22) Filed: Jul. 12, 2011

(65) Prior Publication Data

US 2013/0015292 A1   Jan. 17, 2013

(51) Int. Cl.
| | | |
|---|---|---|
| B32B 3/00 | (2006.01) | |
| B64D 45/02 | (2006.01) | |
| B32B 3/10 | (2006.01) | |
| B32B 5/02 | (2006.01) | |
| B32B 15/02 | (2006.01) | |
| B32B 15/20 | (2006.01) | |
| B32B 27/06 | (2006.01) | |

(52) U.S. Cl.
CPC . B64D 45/02 (2013.01); B32B 3/10 (2013.01); B32B 5/02 (2013.01); B32B 5/028 (2013.01); B32B 15/02 (2013.01); B32B 15/20 (2013.01); B32B 27/06 (2013.01); *B32B 2262/103* (2013.01); *B32B 2405/00* (2013.01); *B32B 2451/00* (2013.01); *B32B 2605/18* (2013.01)
USPC ......... 428/195.1; 428/201; 428/209; 244/1 A; 244/126

(58) Field of Classification Search
CPC .......... B64D 45/02; H02G 13/00; B32B 3/10; B32B 15/08; B32B 15/20; B32B 2451/00; B32B 2605/18
USPC ................ 428/195.1, 201, 209; 244/1 A, 126
See application file for complete search history.

(56) References Cited

U.S. PATENT DOCUMENTS

| | | | |
|---|---|---|---|
| 6,217,945 B1 * | 4/2001 | Fowler | 427/410 |
| 7,050,286 B2 * | 5/2006 | Pridham et al. | 361/218 |
| 7,277,266 B1 * | 10/2007 | Le et al. | 361/218 |
| 7,525,785 B2 | 4/2009 | Rawlings | |
| 7,835,130 B2 | 11/2010 | Ware et al. | |
| 7,869,181 B2 * | 1/2011 | Le | 361/218 |
| 2005/0181203 A1 * | 8/2005 | Rawlings et al. | 428/337 |
| 2007/0230085 A1 * | 10/2007 | Le | 361/212 |

FOREIGN PATENT DOCUMENTS

| | | |
|---|---|---|
| WO | WO02070623 A2 | 9/2002 |
| WO | WO2006019799 A2 | 2/2006 |

OTHER PUBLICATIONS

UK search report dated Nov. 1, 2012 regarding application GB1211695.0, applicant The Boeing Company (5 pages).

* cited by examiner

*Primary Examiner* — Gerard Higgins
(74) *Attorney, Agent, or Firm* — Yee & Associates, P.C.

(57) ABSTRACT

A method and apparatus comprising a layer of material having a decorative graphic and an electrically conductive material in the layer of material. The layer of material is configured to be attached to a surface of an aircraft. The electrically conductive material is configured to cause a current from an atmospheric electrostatic discharge contacting the layer of material to spread out in a desired amount within the layer of material.

18 Claims, 6 Drawing Sheets

DECORATIVE DECAL SYSTEM FOR AN AIRCRAFT

BACKGROUND INFORMATION

1. Field

The present disclosure relates generally to reducing effects of atmospheric electrostatic discharges on aircraft and, in particular, to a method and apparatus for reducing atmospheric electrostatic discharges on composite structures on an aircraft.

2. Background

Aircraft are now being designed and manufactured with greater and greater percentages of composite materials. Some aircraft may have more than 50 percent of their primary structure made from composite materials. Composite materials are used in aircraft to decrease the weight of the aircraft. The decreased weight improves performance features, such as payload capacities and fuel efficiency. Further, composite materials also provide longer service life for various components in the aircraft.

Composite materials are tough, light-weight materials created by combining two or more components. For example, a composite material may comprise fibers and resins that are combined and cured to form the composite material.

Carbon fiber reinforced plastic (CFRP) is an example of a composite material that is increasingly used for structural components in commercial aircraft in place of traditional aluminum structures. Carbon fiber reinforced plastic is one type of composite material that may be used in the skin, spars, and ribs of an aircraft. Carbon fiber reinforced plastic is about 2,000 times more resistive than most metals. These types of composite materials are used, because these materials provide a higher strength-to-weight ratio than aluminum.

These types of composite materials are more resistive than the aluminum that they replace. Atmospheric electrostatic discharges on aluminum typically do not result in inconsistencies that may affect the desired performance of different structures in the aircraft. These atmospheric electrostatic discharges may include lightning. Aluminum is more effective at conducting and dispersing currents from these discharges away from a point of attachment.

In contrast, composite materials often act as a dielectric. As a result, composite materials may react differently to atmospheric electrostatic discharges that contact an aircraft as compared to aluminum.

For example, inconsistencies may occur at the point of entry, exit, or both for the atmospheric electrostatic discharge. For example, an atmospheric electrostatic discharge may cause arcing between a fastener and a hole in the structure in which the fasteners are used to hold the different structural components of the aircraft together.

With less conductivity than aluminum, carbon fiber reinforced plastic is more prone to breakdown when subjected to currents from atmospheric electrostatic discharges as compared to aluminum. This type of arcing may induce an inconsistency on the surface of the aircraft. This inconsistency may take the form of vaporization of material or even fracture and through penetration.

With composite materials in aircraft, the creation of inconsistencies from currents caused by atmospheric electrostatic discharges may be reduced through the use of discharge protection systems. These types of systems may result in a reduction of undesired fracture, arcing at structural joints, fuel couplings, hydraulic couplings within a fuel tank, and other components.

Discharge protection systems for composite structures may be attached to or integrated as part of the skin of an aircraft. Protection against atmospheric electrostatic discharges may be used not only for the composite skins and underlying structures, but also for protection against attachment to underlying systems.

Although effective, the currently-used systems are complex and may increase the costs of an aircraft more than desired. For example, the design of an atmospheric electrostatic discharge protection system may take more time and expense as compared to systems that use aluminum structures. Further, these discharge protection systems for composite structures may affect the design of other systems in the aircraft. As a result, the use of protection systems against atmospheric electrostatic discharges may require changes to provide a desired level of protection against these types of events.

Therefore, it would be advantageous to have a method and apparatus that takes into account at least some of the issues discussed above as well as possibly other issues.

SUMMARY

In one advantageous embodiment, an apparatus comprises a layer of material having a decorative graphic and an electrically conductive material in the layer of material. The layer of material is configured to be attached to a surface of an aircraft. The electrically conductive material is configured to cause a current from an atmospheric electrostatic discharge contacting the layer of material to spread out in a desired amount within the layer of material.

In another advantageous embodiment, a decorative decal system for an aircraft is provided. The decorative decal system comprises a layer of dielectric material having a decorative graphic. The layer of dielectric material is configured to be attached to a surface of an aircraft. The decorative decal system further comprises an electrically conductive foil located within the layer of dielectric material. The electrically conductive foil has a pattern of openings and is configured to cause a current from an atmospheric electrostatic discharge contacting the layer of dielectric material to spread out in a desired amount within the layer of dielectric material.

In yet another advantageous embodiment, a method for managing an atmospheric discharge is provided. An atmospheric electrostatic discharge is received on a decorative decal on a surface of an aircraft. The decorative decal comprises a layer of material having a graphic and a layer of electrically conductive material in the layer of material. A current is spread out by a desired amount using the layer of electrically conductive material within the layer of material.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
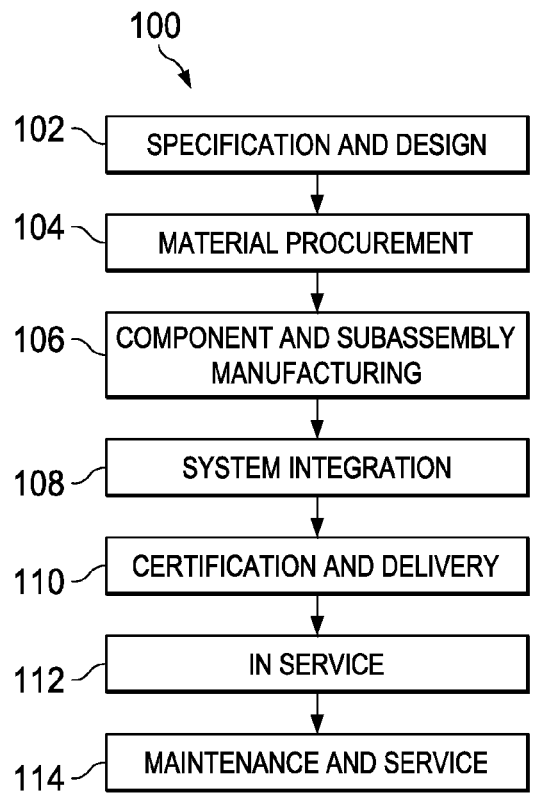
FIG. 1 is an illustration of an aircraft manufacturing and service method in accordance with an advantageous embodiment.
Figure 2:
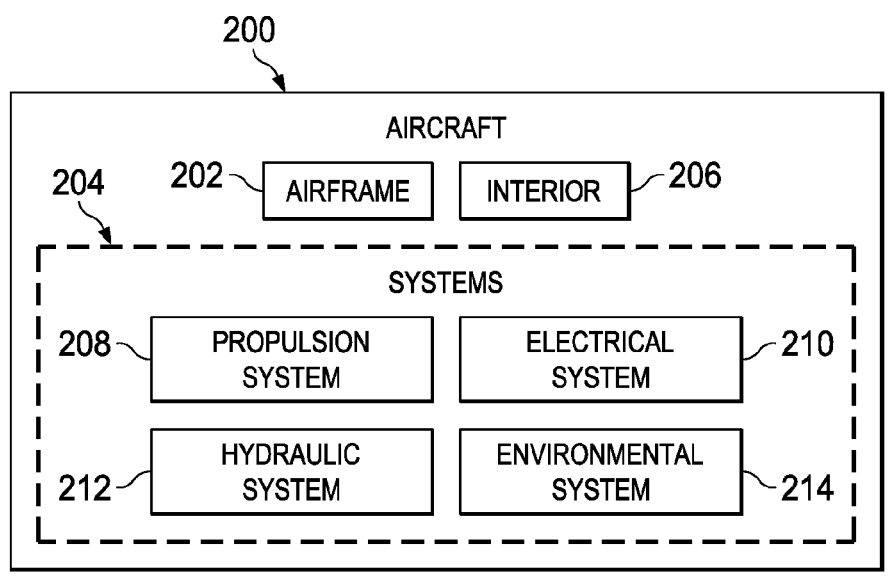
FIG. 2 is an illustration of an aircraft in which an advantageous embodiment may be implemented.

Referring more particularly to the drawings, one or more advantageous embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, a maintenance facility, a rework facility, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages to add decorative decals to aircraft 200. These stages may be, for example, component and subassembly manufacturing 106 and system integration 108 in FIG. 1. A number, when referring to items, means one or more items. For example, a number of apparatus embodiments may be one or more apparatus embodiments.

As another example, a number of apparatus embodiments, method embodiments, or a combination thereof may be utilized to add decorative decals to aircraft 200 while aircraft 200 is in service 112 and/or during maintenance and service 114 in FIG. 1.

The different advantageous embodiments recognize and take into account a number of different considerations. For example, the different advantageous embodiments recognize and take into account that various coatings may be placed on the composite skin of an aircraft. These coatings include primer, paint, sealants, and/or other types of coatings.

The different advantageous embodiments recognize and take into account that when designing protection systems for atmospheric electrostatic discharges, these systems may be designed to take into account the use of coatings on the skin of the aircraft. These coatings often take the form of dielectric materials.

The different advantageous embodiments recognize and take into account that testing is performed to determine whether the protection system is capable of providing a desired level of protection against atmospheric electrostatic discharges. As a result, different protection systems may be capable of providing a desired level of protection for different thicknesses of coatings on the skin of an aircraft. For example, a protection system may be capable of providing a desired level of protection for coatings that may not be more than about 10 milli-inches.

The different advantageous embodiments recognize and take into account that when a discharge protection system is designed, many processes for manufacturing the discharge protection system are put in place for testing of the systems. Changes to the design of a protection system may require an undesired amount of time and expense to redesign and/or retest the discharge protection system when coatings or other dielectrics are placed on the surface of the aircraft that are thicker than what the discharge protection system is designed to take into account.

The different advantageous embodiments recognize and take into account that in some cases, customers that purchase aircraft may desire to place graphics in different places. These graphics may be logos, trademarks, pictures, and other designs. The graphics are often added in the form of a decorative decal that is placed on top of other coatings on the aircraft. Decorative decals are typically manufactured as a flat material that is flexible. Further, decorative decals may be pre-molded with shapes for non-planar surfaces.

The different advantageous embodiments recognize and take into account that the use of these decorative decals on different locations of an aircraft may result in a thickness of dielectric material that may be greater than desired for a particular discharge protection system. As a result, the discharge protection system and/or load-bearing structures may be redesigned to take into account the use of these decals.

The redesign of the protection system and/or load-bearing systems, however, may take more time and expense than desired. Delays may be present in delivering aircraft when a customer decides to use decals that may result in thicknesses of dielectric material that are greater than a desired thickness for the protection system on the aircraft.

One or more of the different advantageous embodiments provides a method and apparatus for a decorative decal. In one advantageous embodiment, an apparatus comprises a layer of material and an electrically conductive material in the layer of material. The layer of material has a decorative graphic. The layer of material is configured to be attached to a surface of an aircraft. The electrically conductive material is configured to cause current from an atmospheric electrostatic discharge contacting the layer of material to spread out in a desired amount within the layer of material.

Figure 3:
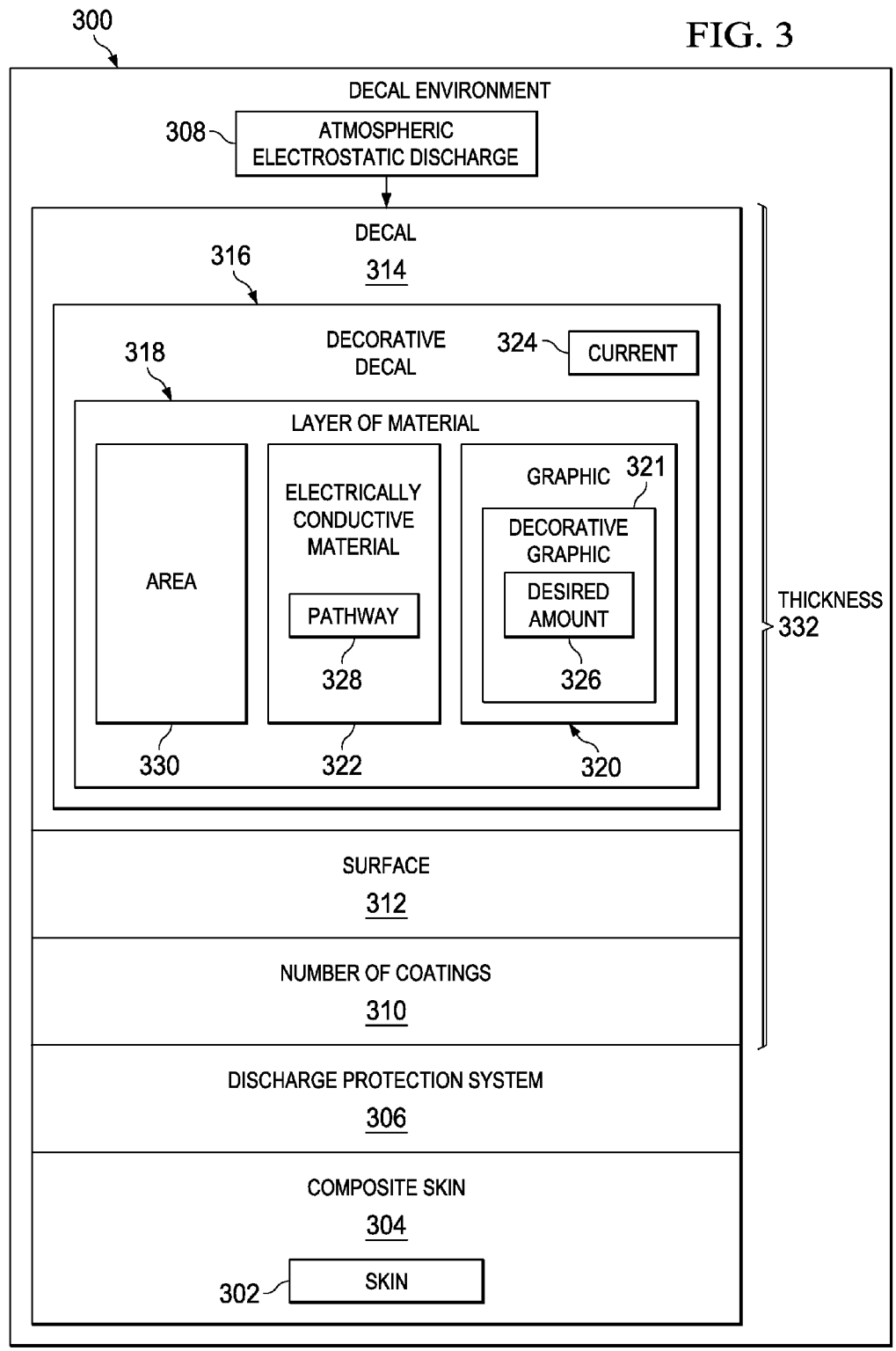
FIG. 3 is an illustration of a decal environment in accordance with an advantageous embodiment.

With reference now to FIG. 3, an illustration of a decal environment is depicted in accordance with an advantageous embodiment. Decal environment 300 is an example of an environment that may be implemented in aircraft 200 in FIG. 2. In this illustrative example, skin 302 takes the form of composite skin 304 for aircraft 200 in FIG. 2. In this illustrative example, discharge protection system 306 is associated with composite skin 304.

The association is a physical association in these depicted examples. A first component, such as discharge protection system 306, may be considered to be associated with a second component, such as composite skin 304, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, discharge protection system 306 is configured to manage occurrences of atmospheric electrostatic discharge 308. In these illustrative examples, discharge protection system 306 may be implemented using any currently available or known discharge protection systems. These protection systems may take the form of lightning protection systems.

In this illustrative example, number of coatings 310 are present on composite skin 304 and/or discharge protection system 306. Number of coatings 310 forms surface 312 on aircraft 200 in FIG. 2. Number of coatings 310 may be, for example, without limitation, primer, paint, sealant, and other suitable types of coatings. Number of coatings 310 are typically nonconductive and may be comprised of dielectric materials.

In these illustrative examples, decal 314 may be placed on surface 312 of aircraft 200. In other words, decal 314 may be placed on top of number of coatings 310. In this manner, decal 314 may be a top layer on surface 312 of aircraft 200. A decal is a substrate that may be placed on another surface upon contact. A decal may also be referred to as an appliqué.

In these illustrative examples, decal 314 is decorative decal 316 and may be placed on top of number of coatings 310 on surface 312. In other words, surface 312 is the exposed surface prior to the application of decorative decal 316. Decorative decal 316 has a primarily aesthetic function. In these illustrative examples, decorative decal 316 may cover a portion or all of surface 312, depending upon the particular implementation.

As illustrated, decorative decal 316 is comprised of layer of material 318 having graphic 320. In these illustrative examples, layer of material 318 may be comprised of different types of materials. As one illustrative example, layer of material 318 may be a layer of dielectric material. In other illustrative examples, layer of material 318 may be comprised of a material selected from at least one, for example, without limitation, a dielectric material, a plastic, a polymer, and other suitable materials.

Layer of material 318 may be selected as any material that can be attached to surface 312 of aircraft 200 in FIG. 2. Further, layer of material 318 may be selected based on an ability to withstand environmental conditions during operation of aircraft 200.

In these illustrative examples, graphic 320 may be decorative graphic 321. Decorative graphic 321 may take different forms. For example, without limitation, decorative graphic 321 may be at least one of text, a pattern, a logo, a picture, an image, and other suitable types of graphics.

In these illustrative examples, electrically conductive material 322 is located within layer of material 318. Electrically conductive material 322 may be comprised of at least one of aluminum, copper, steel, titanium, and other conductive materials.

In addition, electrically conductive material 322 may take different forms. For example, electrically conductive material 322 may be selected from at least one of fibers, wires, a mesh, a foil, a foil with a pattern of openings, and other suitable types of electrically conductive materials. As one illustrative example, electrically conductive material 322 may be an electrically conductive foil. The electrically conductive foil may be dispersed within layer of material 318, within a layer within layer of material 318, or a number of layers within layer of material 318.

In these illustrative examples, the material and/or configuration of electrically conductive material 322 is selected to cause current 324 from atmospheric electrostatic discharge 308 to spread out by a desired amount within layer of material 318. For example, electrically conductive material 322 may have a pattern of openings configured to cause current 324 from atmospheric electrostatic discharge 308 to spread out by a desired amount within layer of material 318. In other words, when atmospheric electrostatic discharge 308 contacts surface 312, current 324 may travel through layer of material 318 in decorative decal 316 in a manner that spreads out by desired amount 326 before leaving layer of material 318.

In these illustrative examples, electrically conductive material 322 may be configured to provide pathway 328 for current 324 such that current 324 spreads out into area 330 in layer of material 318. By having current 324 spread into area 330, current 324 may spread out by desired amount 326. Desired amount 326 of current 324 spreading out in layer of material 318 is selected to avoid a reduction in the performance of discharge protection system 306 if current 324 leaves layer of material 318 and travels through number of coatings 310 towards discharge protection system 306.

Decorative decal 316 may be attached to aircraft 200 in a number of different ways. For example, decorative decal 316 may be attached to surface 312 of number of coatings 310 using an adhesive, a conductive adhesive, and/or any other process or mechanism for attaching decals to a surface of a structure.

As discussed above, thickness 332 of number of coatings 310 and decorative decal 316 may result in a layer of insulation or dielectric material that reduces the ability of discharge protection system 306 to manage current 324 when atmospheric electrostatic discharge 308 occurs. As a result, electrically conductive material 322 within layer of material 318 is configured to assist discharge protection system 306 in managing atmospheric electrostatic discharge 308 in a desired manner.

Without electrically conductive material 322, inconsistencies may occur as a result of current 324 not being spread out when current 324 reaches discharge protection system 306. In other words, decorative decal 316 with electrically conductive material 322 may be configured to reduce and/or prevent a "punch through" event that may occur from atmospheric electrostatic discharge 308.

In this manner, decorative decal 316 may be added on top of number of coatings 310 such that thickness 332 may not reduce the effectiveness of discharge protection system 306.

The illustration of decal environment 300 in FIG. 3 is not meant to imply physical or architectural limitations to a manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in other illustrative examples, a number of decorative decals in addition to decorative decal 316 may be present in decal environment 300. In other illustrative examples, decorative decal 316 may be placed directly on composite skin 304 without number of coatings 310, depending on the particular implementation. In still other illustrative examples, a coating also may be placed over decorative decal 316.

As another example, decorative graphic 321 may be omitted and decal 314 may be used with electrically conductive material 322 being located within decal 314. For example, decal 314 may be placed on top of or under another decal that may not include electrically conductive material 322. In particular, decal 314 with electrically conductive material 322 may be used in conjunction with a decorative decal that does not include electrically conductive material 322.

Figure 4:
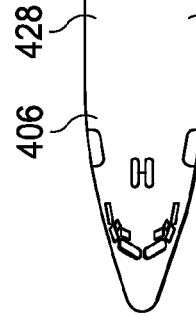
FIG. 4 is an illustration of an aircraft in accordance with an advantageous embodiment.

With reference now to FIG. 4, an illustration of an aircraft is depicted in accordance with an advantageous embodiment. Aircraft 400 is an example of a physical implementation of aircraft 200 in FIG. 2. Aircraft 400 may be used with decal environment 300 in FIG. 3 in these illustrative examples.

As depicted, aircraft 400 has wings 402 and 404 attached to body 406. Aircraft 400 also includes engine 408, engine 410, and tail 412. A decal, such as decorative decal 316 in FIG. 3 may be placed in various locations on aircraft 400. For example, without limitation, decorative decal 316 may be placed on aircraft 400 at locations 414, 416, 418, 420, 422, 424, 426, 428, and other suitable locations. The different locations illustrated on aircraft 400 are only some locations in which decorative decal 316 may be placed.

Figure 5:
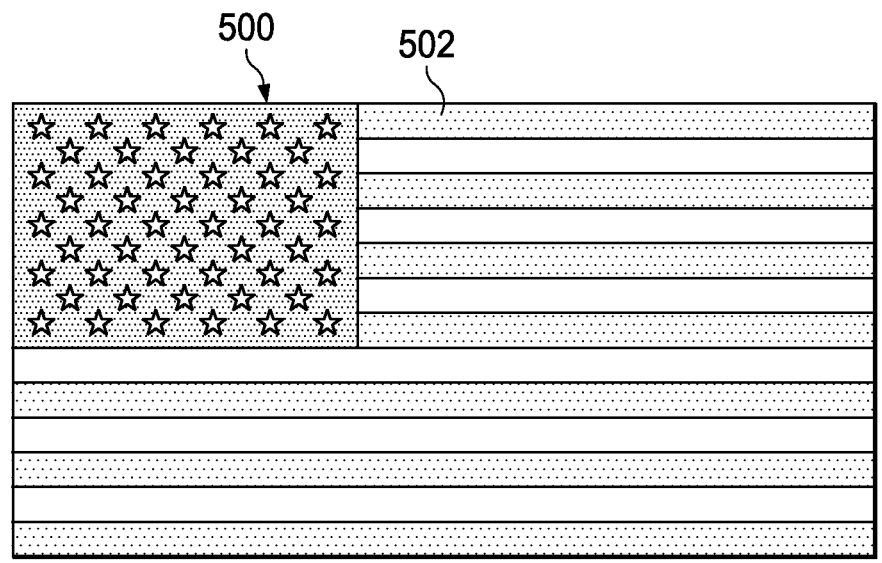
FIG. 5 is an illustration of a decorative decal in accordance with an advantageous embodiment.

Turning next to FIG. 5, an illustration of a decorative decal is depicted in accordance with an advantageous embodiment. In this illustrative example, decorative decal 500 is an example of one physical implementation for decorative decal 316 shown in block form in FIG. 3. In this illustrative example, decorative decal 500 may be placed on different locations on aircraft 400 in FIG. 4. Decorative decal 500 has graphic 502.

Figure 6:
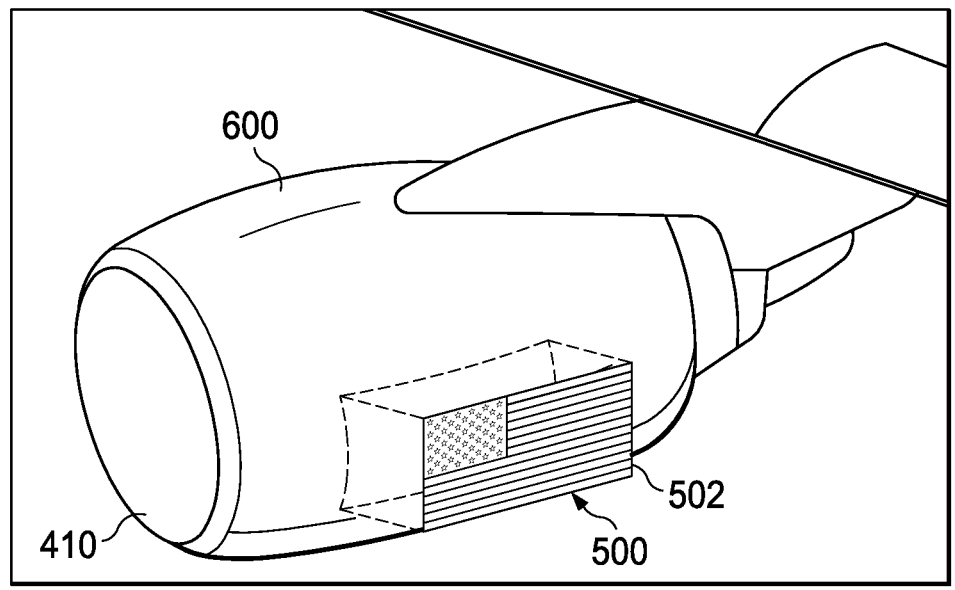
FIG. 6 is an illustration of a portion of an aircraft with a decorative decal in accordance with an advantageous embodiment.

With reference now to FIG. 6, an illustration of a portion of aircraft 400 in FIG. 4 with a decorative decal is depicted in accordance with an advantageous embodiment. In this illustrative example, a perspective view of engine 410 can be seen in this figure. Decorative decal 500 is placed on nacelle 600 for engine 410.

Figure 7:
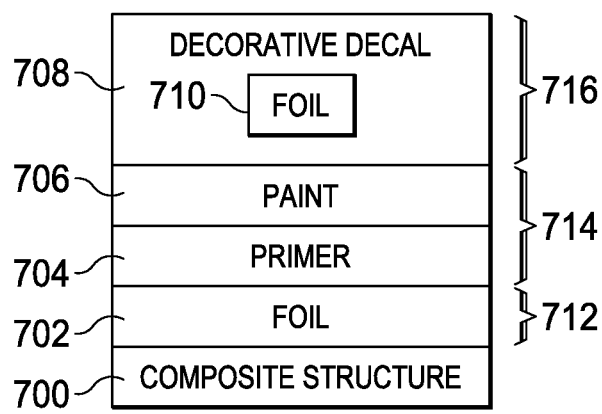
FIG. 7 is an illustration of a cross-sectional view of layers in a decal environment in accordance with an advantageous embodiment.

With reference now to FIG. 7, a cross-sectional view of layers in a decal environment is depicted in accordance with an advantageous embodiment. In this illustrative example, composite structure 700 may be, for example, composite skin 304 in FIG. 3. As depicted, foil 702 is an example of discharge protection system 306 in FIG. 3. Foil 702 is associated with composite structure 700.

Primer 704 and paint 706 are formed on top of foil 702 in this illustrative example. Primer 704 and paint 706 are examples of number of coatings 310 in FIG. 3.

Foil 710 is inside of decorative decal 708. Decorative decal 708 is placed on top of paint 706 in this illustrative example. Decorative decal 708 is an example of decorative decal 316 in FIG. 3. Foil 710 is an example of electrically conductive material 322 in FIG. 3.

In this illustrative example, foil 702 has thickness 712. Thickness 712 is about two milli-inches. Thickness 712 may be from about two milli-inches to about six milli-inches. Primer 704 and paint 706 has thickness 714. Thickness 714 is about eight milli-inches in this illustrative example. Thickness 714 may be from about three milli-inches to about 10 milli-inches. Decorative decal 708 has thickness 716. Thickness 716 is about six milli-inches. Thickness 716 may vary from about six milli-inches to about 10 milli-inches.

In this illustrative example, the thickness of the different layers on foil 702 and composite structure 700 may be about 10.8 mils. Normally, a thickness of about 8.0 mils is a desired thickness for a desired performance of foil 702 when atmospheric electrostatic discharges occur. With decorative decal 708 having foil 710, the increased thickness may still allow for a desired level of performance by foil 702 in response to an atmospheric electrostatic discharge.

The illustration of the layers in FIG. 7 are examples of layers that may be used in decal environment 300. The illustration of these layers is not meant to imply physical or architectural limitations to the manner in which layers may be implemented in other examples.

For example, other layers may be used in addition to and/or in place of the layers illustrated in FIG. 7. A promoter adhesion layer may be used between primer 704 and foil 702. A dielectric layer may be present between foil 702 and composite structure 700. Primer 704 may be omitted. An adhesive layer may be present between decorative decal 708 and paint 706. Decorative decal 708 may have an additional layer of foil in addition to foil 710. These and other changes may be made for use in decal environment 300 in FIG. 3.

Figure 8:
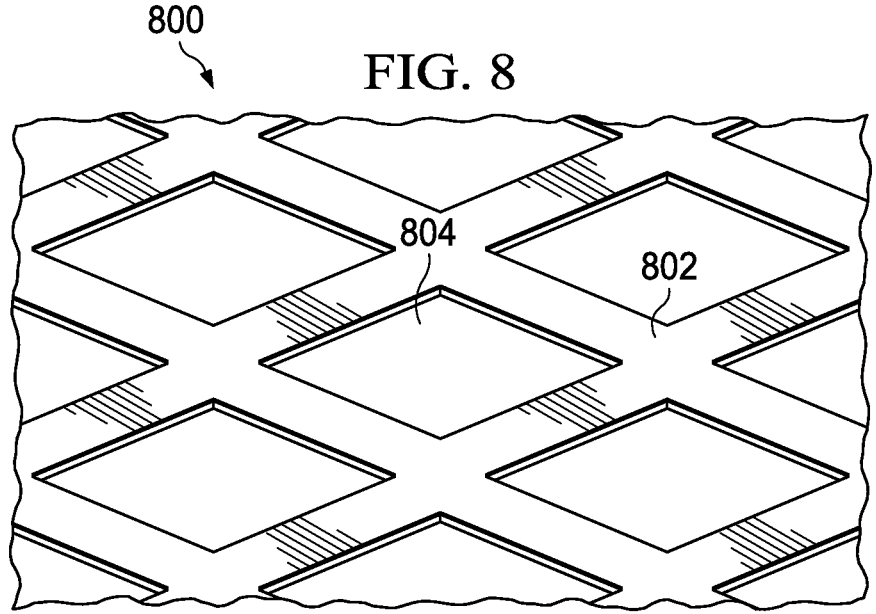
FIG. 8 is an illustration of a portion of a conductive material in accordance with an advantageous embodiment.

In FIG. 8, an illustration of a portion of a conductive material is depicted in accordance with an advantageous embodiment. In this illustrative example, foil 800 is an example of an implementation for electrically conductive material 322 in FIG. 3. In particular, foil 800 is shown in a perspective view and may be used to implement foil 710 in FIG. 7. In this illustrative example, foil 800 is a layer of metal 802 with pattern of holes 804 in metal 802.

The different components illustrated in FIGS. 4-8 may be combined with components shown in block form in FIG. 3, used with components in FIG. 3, or a combination of the two. Additionally, some of the components in FIGS. 4-8 may be illustrative examples of how components shown in block form in FIG. 3 may be implemented as physical structures.

Figure 9:
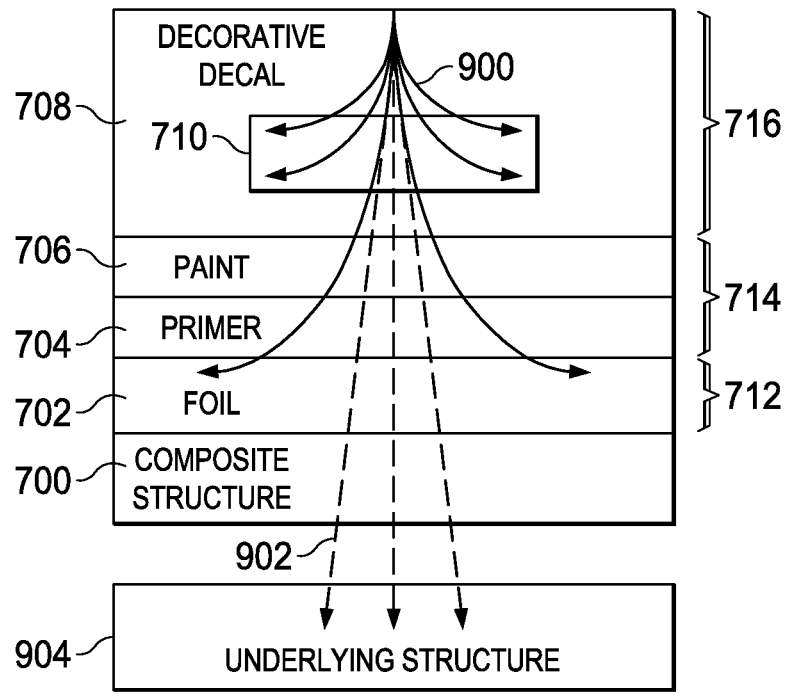
FIG. 9 is an illustration of a desired spreading of current in accordance with an advantageous embodiment.

In FIG. 9, an illustration of a desired spreading of current is depicted in accordance with an advantageous embodiment. In this illustrative example, current 900 is illustrated using solid lines. Current 900 flows through decorative decal 708. As depicted, current 900 spreads out in a desired manner.

In contrast, current 902, shown with dashed lines, flows in an undesired manner. Current 902 may flow through decorative decal 708 if foil 710 is absent from within decorative decal 708.

As can be seen in this illustrative example, current 900 may spread out through foil 710 by a desired amount. As a result, any portion of current 902 flowing toward a composite structure may be managed by foil 702. In this example, current 902 may flow through foil 702 and into composite structure 700 in an undesired manner.

If current 902 flows through composite structure 700 into underlying structure 904 as depicted, underlying structure 904 may not perform as desired. For example, inconstancies may occur in underlying structure 904 that may reduce loads for forces that underlying structure 904 can withstand. If underlying structure 904 is an electrical system, the electrical system may not operate as desired.

Figure 10:
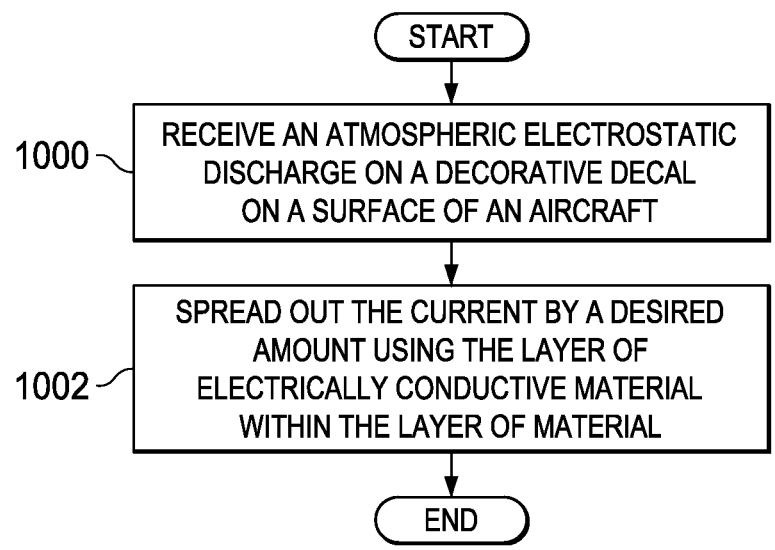
FIG. 10 is an illustration of a flowchart of a process for managing an atmospheric electrostatic discharge in accordance with an advantageous embodiment.

With reference now to FIG. 10, an illustration of a flowchart of a process for managing an atmospheric electrostatic discharge is depicted in accordance with an advantageous embodiment. The flowchart illustrated in FIG. 10 may be implemented using decal environment 300 in FIG. 3.

The process begins by receiving an atmospheric electrostatic discharge on a surface of an aircraft having a decorative decal (operation 1000). The atmospheric electrostatic discharge may directly contact the decorative decal. In other examples, the atmospheric electrostatic discharge may contact another portion of the aircraft with the current traveling into the decorative decal.

In these illustrative examples, the decorative decal comprises a layer of material having a graphic and an electrically conductive material in the layer of material.

The process spreads out the current by a desired amount using the layer of electrically conductive material within the layer of material (operation 1002), with the process terminating thereafter. In other words, the electrically conductive material is configured to form a pathway for the current such that the current spreads out into an area in the layer of material by a desired amount. By spreading out the current, undesired inconsistencies that may be caused by the current exiting the decorative decal on the layers under the decorative decal may be reduced. When current is spread out by the desired amount, these undesired inconsistencies may be reduced. For example, undesired inconsistencies in coating and/or discharge protection systems may be reduced. Further, the discharge protection system for the aircraft may perform as desired.

The decorative decal in an advantageous embodiment provides an ability to add additional aesthetics to an aircraft. These aesthetics may be placed in locations that normally may reduce the performance of the discharge protection system because of the thickness of dielectric material, such as paint, sealants, and other coatings that may be placed on the aircraft.

In this manner, graphics may be added using decals without requiring redesigning of a discharge protection system. Further, the time needed to test changes in a discharge protection system also may be reduced. Providing a decorative decal, such as decorative decal 316 in FIG. 3, may be less expensive and time consuming than redesigning and testing discharge protection system 306 to provide a desired level of performance in managing atmospheric electrostatic discharges that may contact an aircraft.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A decal attached to an aircraft having a discharge protection system comprising:
    an aircraft structure comprising a composite skin and the discharge protection system comprising a foil;
    a coat of primer on the aircraft structure;
    a coat of paint covering the coat of primer; and
    the decal comprising a layer of material having a decorative graphic and an electrically conductive material in the layer of material, the layer of material being attached to a surface of the aircraft such that the coat of primer and the coat of paint are positioned between the layer of material and the aircraft structure,
    wherein the electrically conductive material is configured to cause a current from an atmospheric electrostatic discharge contacting the layer of material to spread out in a desired amount within the electrically conductive material, and wherein the foil of the discharge protection system has a thickness of from about two milli-inches to about six milli-inches.

2. The decal of claim 1, wherein the layer of the material having the decorative graphic and the electrically conductive material in the layer of material form a decorative decal.

3. The decal of claim 2, wherein the decorative decal is located at least partially over the discharge protection system.

4. The decal of claim 2, wherein the decorative decal avoids reducing an effectiveness of the discharge protection system in managing the current when the current exits the decorative decal and reaches the discharge protection system.

5. The decal of claim 2, wherein the decorative decal is a top layer on the surface of the aircraft.

6. The decal of claim 1, wherein the electrically conductive material is configured to cause the current from the atmospheric electrostatic discharge contacting the layer of material to spread out the desired amount within the layer of material before the current exits the layer of material.

7. The decal of claim 1, wherein in being configured to cause the current from the atmospheric electrostatic discharge contacting the layer of material to spread out in the desired amount within the layer of material before exiting the layer of material, the electrically conductive material forms a pathway for the current such that the current spreads out into an area in the layer of material by the desired amount.

8. The decal of claim 1, wherein the decorative graphic comprises at least one of text, a pattern, a logo, a picture, or an image.

9. The decal of claim 1, wherein the electrically conductive material comprises at least one of aluminum, copper, steel, or titanium.

10. The decal of claim 1, wherein the electrically conductive material is in a form selected from at least one of fibers, wires, a mesh, a foil, or a foil with a pattern of openings.

11. The decal of claim 1, wherein the layer of material comprises a material selected from at least one of a dielectric material, plastic, or a polymer.

12. The decal of claim 1, wherein the layer of material is connected to the surface of the aircraft using at least one of an adhesive or a conductive adhesive.

13. The decal of claim 1, wherein the decal has a thickness of from about six milli-inches to about ten milli-inches.

14. The decal of claim 1, wherein the coat of primer and the coat of paint have a thickness of from about three milli-inches to about ten milli-inches.

15. A decorative decal system affixed to an aircraft comprising:
   an aircraft structure comprising a composite skin and a discharge protection system comprising a foil;
   a coat of primer on the aircraft structure;
   a coat of paint covering the coat of primer; and
   the decorative decal system comprising a layer of polymer having a decorative graphic and an electrically conductive foil within the layer of polymer, wherein the layer of polymer is attached to a surface of the aircraft such that the coat of primer and the coat of paint are positioned between the aircraft structure and layer of polymer,
   wherein the electrically conductive foil causes a current from an atmospheric electrostatic discharge contacting the layer of polymer to spread out in a desired amount through the electrically conductive foil within the layer of polymer and through the discharge protection system, and wherein the foil of the discharge protection system has a thickness of from about two milli-inches to about six milli-inches.

16. The decorative decal system of claim 15, wherein the electrically conductive foil has a pattern of openings and is configured to cause the current from the atmospheric electrostatic discharge contacting the layer of polymer to spread out in the desired amount within the layer of polymer before the current exits the layer of polymer.

17. The decorative decal system of claim 15, wherein the decorative decal system has a thickness of from about six milli-inches to about ten milli-inches.

18. The decorative decal system of claim 17, wherein the coat of primer and the coat of paint have a thickness of from about three milli-inches to about ten milli-inches.

\* \* \* \* \*